(12) United States Patent
Hedeen

(10) Patent No.: US 6,805,209 B2
(45) Date of Patent: Oct. 19, 2004

(54) WHEELCHAIR MOTORIZING APPARATUS

(76) Inventor: Nils Hedeen, 2741 N. Campbel Ave., Chicago, IL (US) 60647-1922

(*) Notice: Subject to any disclaimer, the term of this patent is extended or adjusted under 35 U.S.C. 154(b) by 112 days.

(21) Appl. No.: 10/107,641

(22) Filed: Mar. 27, 2002

(65) Prior Publication Data
US 2003/0183428 A1 Oct. 2, 2003

(51) Int. Cl.[7] ............................................. B62D 55/075
(52) U.S. Cl. ....................... 180/9.32; 280/5.22; 180/907
(58) Field of Search ........................... 180/9, 9.1, 9.22, 180/9.26, 9.28, 9.32, 907; 280/5.22, 250.1, 304.1

(56) References Cited

U.S. PATENT DOCUMENTS

| 2,765,860 | A | * | 10/1956 | Church | 180/9.3 |
| 3,288,234 | A | * | 11/1966 | Feliz | 180/9.3 |
| 4,566,551 | A | * | 1/1986 | Feliz | 180/9.3 |
| 5,395,129 | A | * | 3/1995 | Kao | 180/9.3 |

* cited by examiner

Primary Examiner—Lesley D. Morris
Assistant Examiner—Matthew Luby
(74) Attorney, Agent, or Firm—Douglas B. White

(57) ABSTRACT

A wheelchair motorizing apparatus employs an articulated tread drive in combination with front support wheels and rear drive wheels. The tread drive is used to provide traction during the ascent or descent of stairs or the traversing of obstacles, the front support wheels are used to raise and lower the front of the wheelchair, and the rear drive wheels are used to raise and lower the rear of the wheelchair in addition to providing drive traction and steering. A positioning mechanism integral with the tread drive acts to keep the treads in contact with the terrain or stairs.

19 Claims, 12 Drawing Sheets

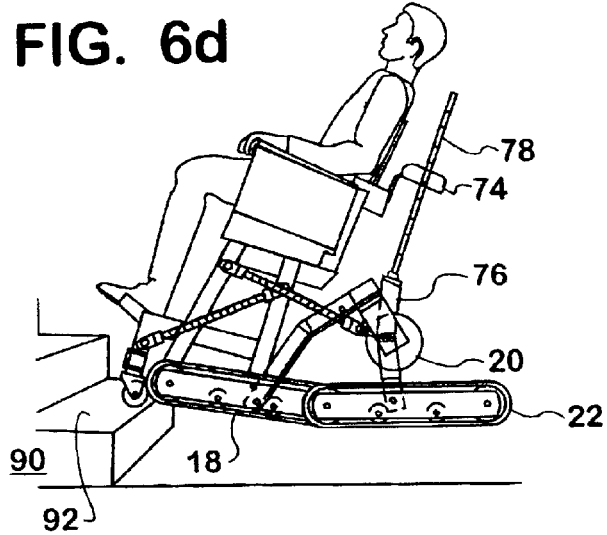
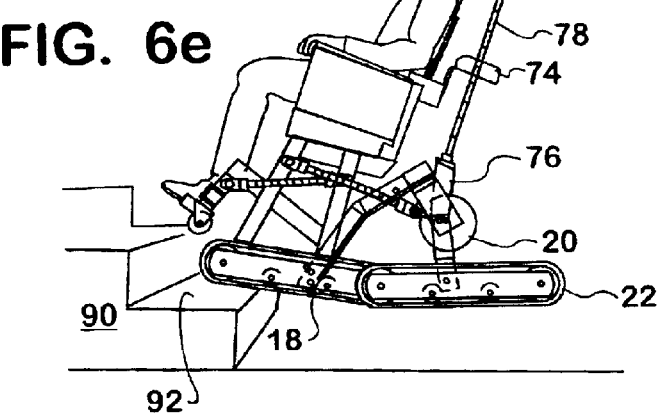
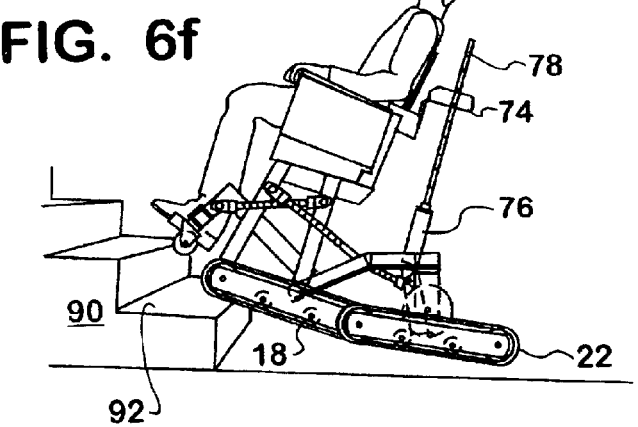

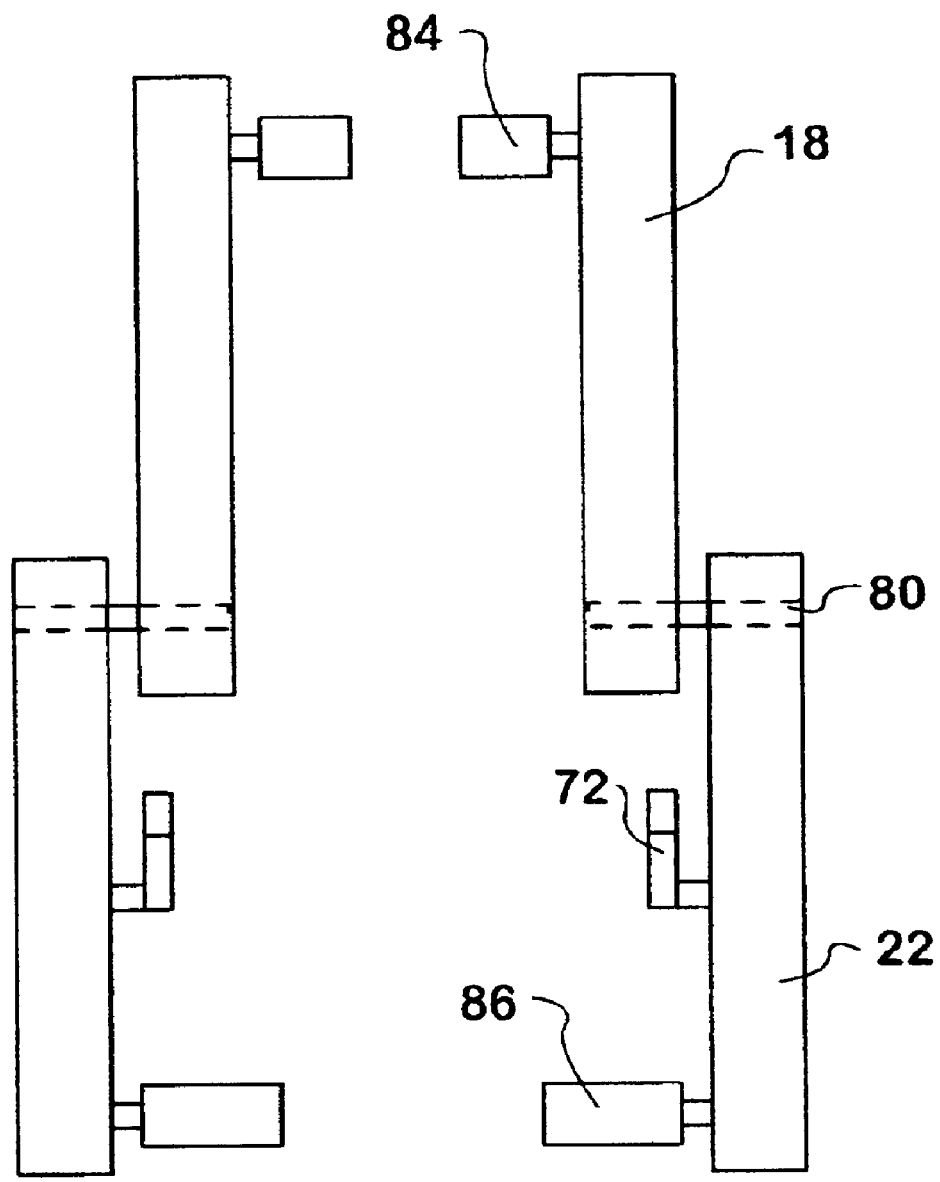

WHEELCHAIR MOTORIZING APPARATUS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to motorized wheelchairs and more particularly to the motorizing apparatus in the under carriage that includes the support, drive and positioning control mechanisms of the wheelchair. Specifically, this invention relates to an improvement in the motorizing apparatus of the wheelchair which facilitates the navigation of stairs, irregular terrain or other obstacles.

2. Description of the Prior Art

In the prior art, wheelchairs have often used motorized drives on the rear wheels, and typical prior art systems are disclosed in U.S. Pat. No. 5,477,935, U.S. Pat. No. 5,197,559 and U.S. Pat. No. 5,161,630. Prior art steering has been accomplished by means of inducing a speed differential between two rear wheels, or alternatively, as disclosed in U.S. Pat. No. 6,334,497, a pivoting front wheel is used for steering.

While these prior innovations greatly aided the person in the wheelchair in achieving improved mobility, the operator was still confronted with the difficulty (or impossibility) of traversing rough terrain and navigating obstacles or stairs. One of the problems confronting the wheelchair operator was that regardless of the drive mechanism, the wheelchair would be unstable and lose traction when attempting to navigate large obstacles or stairs. This problem naturally restricted most prior wheelchairs to flat terrain and required the occupant to seek assistance when confronting rough terrain or stairs.

Some prior art wheelchairs attempted to solve the stair climbing problem. In U.S. Pat. No. 6,328,120 and U.S. Pat. No. 5,513,716 apparatus is described which uses climbing arms that extend from the wheelchair to lift the wheelchair from one stair to the next. While these prior art wheelchairs theoretically could climb stairs, they did not eliminate the dangerous instability and loss of traction of the prior art, and they did not present a safe solution for generally traversing all obstacles and stairs.

SUMMARY OF THE INVENTION

The present invention solves the aforementioned instability and slippage problem for the wheelchair and allows the operator to safely drive the wheelchair up and down stairs and over large obstacles and rough terrain. This is accomplished principally by the use of dual, articulated, front and rear, driving treads. This tread drive is used to provide the necessary traction, and the mechanism used for positioning the tread drive also assists in controlling the wheelchair disposition. In addition to the tread drive, front support wheels are used to raise and lower the front of the wheelchair, and rear drive wheels are used for both drive traction and steering. In a further feature of this invention, a mechanism is disclosed for providing swivel steering capabilities to the rear drive wheels.

BRIEF DESCRIPTION OF THE DRAWINGS

FIGS. 6a–6h are sequential views showing the wheelchair ascending a stairway and illustrating the employment of the tread drive feature for climbing stairs.

FIG. 11 is a plan view of the tread drive of the wheelchair motorizing apparatus.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
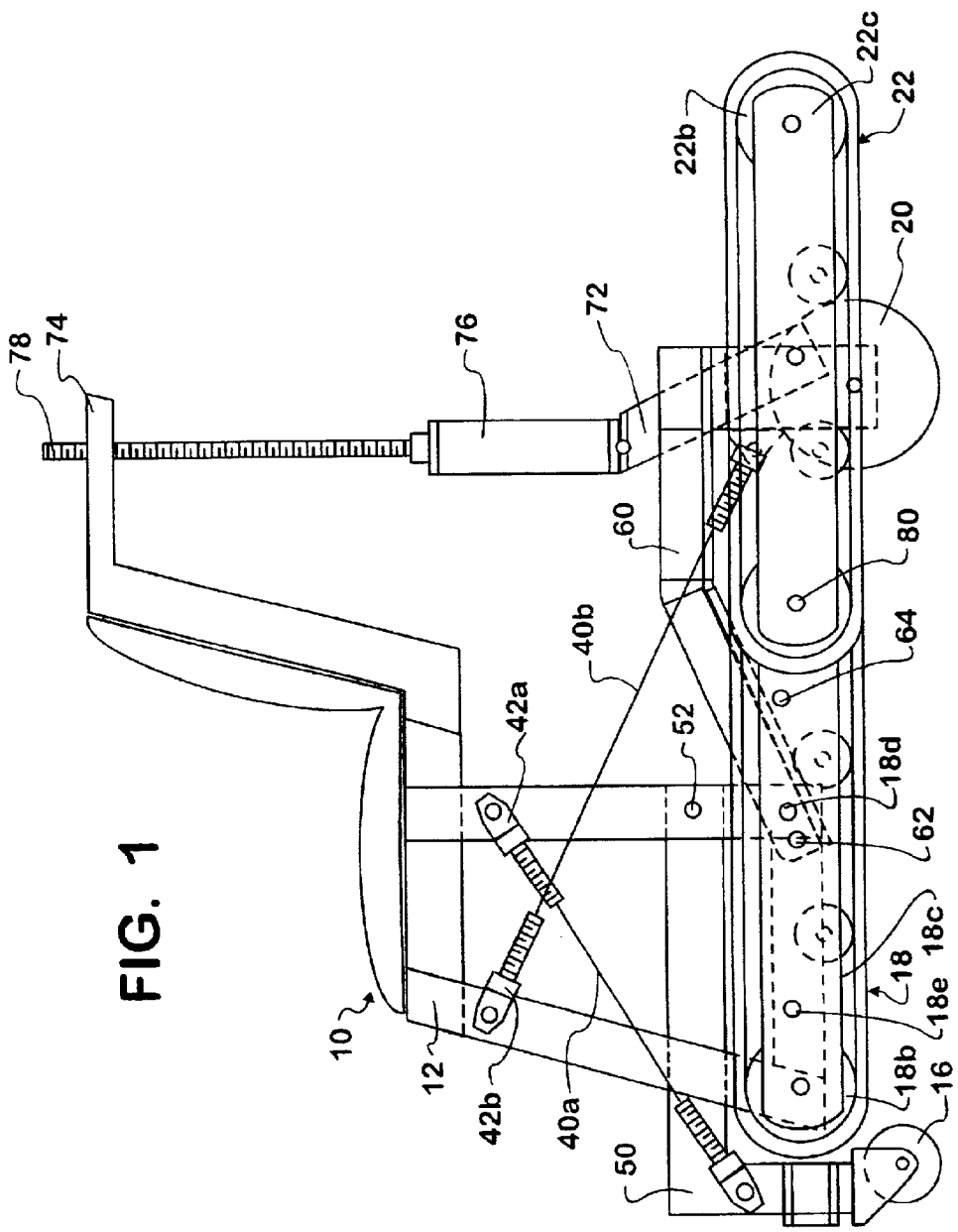
FIG. 1 is a side view of a wheelchair showing the under carriage of the wheelchair positioned for locomotion under rear wheel traction.

Turning first to FIG. 1 there is shown a wheelchair for locomotion along a supporting contact surface (hereinafter often referred to simply as the "ground") having a seat 10 attached to a wheelchair base member 12 for support of the wheelchair occupant and the wheelchair apparatus. The wheelchair under carriage includes paired front support wheels 16, paired front tread drives 18, paired rear drive wheels 20 and paired rear tread drives 22. It is to be noted here that while generally only the left side of the wheelchair under carriage is depicted in most of the drawing views, the right side, while not shown, is the mirror image of the left side and identical in every respect.

In FIG. 1 the wheelchair is shown being supported by paired front support wheels 16 and paired rear drive wheels 20. In such an arrangement the tread drive can be easily and quickly deployed, as described below, in the event of an encounter with an obstacle. With the wheelchair under carriage in this arrangement, locomotion and steering of the wheelchair is accomplished by means for applying torque to the rear wheels 20. Particularly, this torque is applied through battery powered electric motors 32a and 32b (see FIG. 9a) which are mechanically coupled to the wheels, in a manner well known to the art, to provide the desired forward and reverse motion. Steering is then accomplished by applying a differential in the speed of these rear drive wheels through the controlled differential in the application of torque by the electric motors.

As an additional feature, steering may also be accomplished by swiveling the rear drive wheels (FIGS. 9a, 9b, 10a, and 10b) to direct their drive motion to the side. The swiveling of the rear wheels, as more fully described below, is accomplished either by means of a gear apparatus (shown in FIGS. 9a–9b) or a linkage apparatus (shown in FIGS. 10a–10b), or other equivalent means known to the art. This swivel steering allows for turning of the wheelchair in a tight pattern and particularly this feature may be used when it is desired to turn the wheelchair around sharply, such as when one desires to back up to an object or stairway (see FIGS. 7a and 7b).

The wheelchair apparatus of the present invention includes an articulated, front 18 and rear 22, tread drive. The rear tread drive 22 is propelled by motor powered rear tread drive wheels 22b which are mounted to the rear tread drive frame 22c. As more fully described below, this rear tread drive is arranged to pivot and thereby selectively contact the ground. The front tread drive 18 is propelled by motor powered front tread drive wheels 18b which are mounted to the front tread drive frame 18c. This front tread drive apparatus is attached to the wheelchair base 12 by a pivot connection 18d and connected near the front of the wheelchair by a releasable pin 18e for selectively locking the front tread drive into position. In the preferred embodiment this pin 18e is electro-mechanically controlled (in a manner well known to the art) to allow easy selective release when it is desired to tilt the wheelchair base member relative to the front tread drive.

Figure 2:
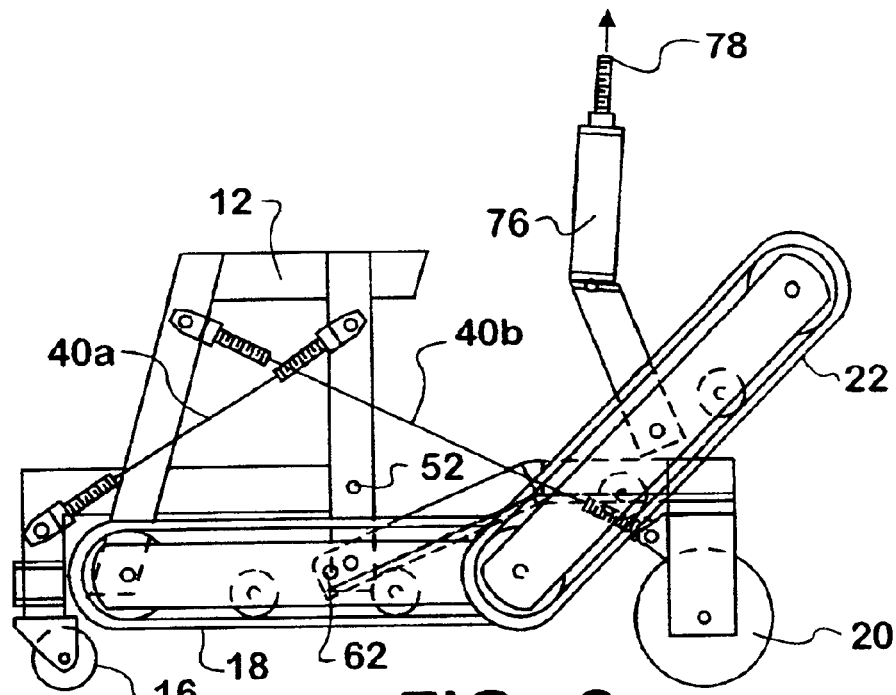
FIG. 2 is a side view of the wheelchair under carriage of FIG. 1, but with the under carriage positioned for normal travel under rear drive wheel power, showing the rear tread drive lifted to allow the rear wheels freedom to swivel for steering.
Figure 3:
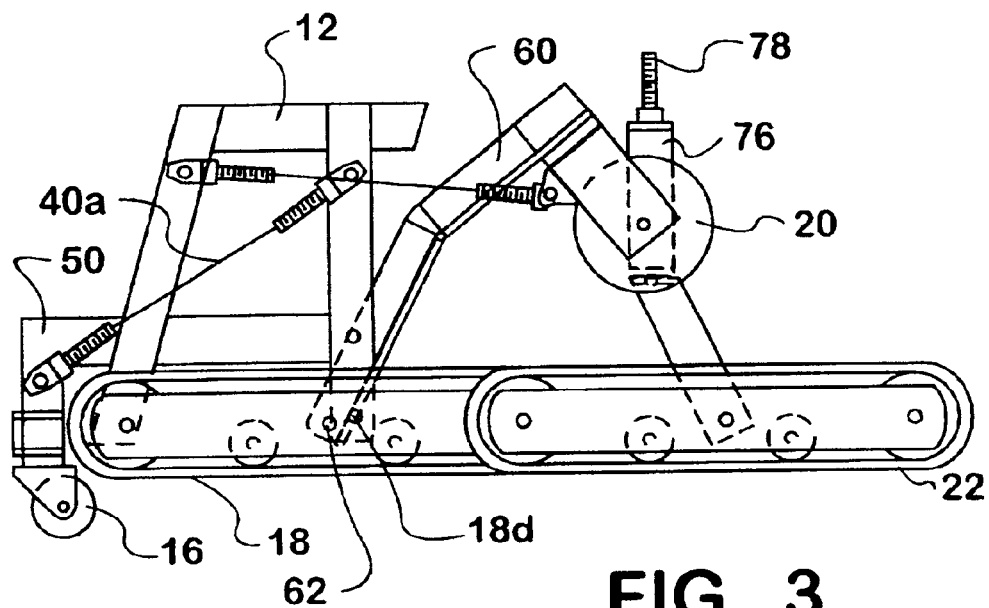
FIG. 3 is a side view of the wheelchair under carriage of FIG. 1 with the rear drive wheels elevated to allow the rear treads to provide drive traction.
Figure 2A:
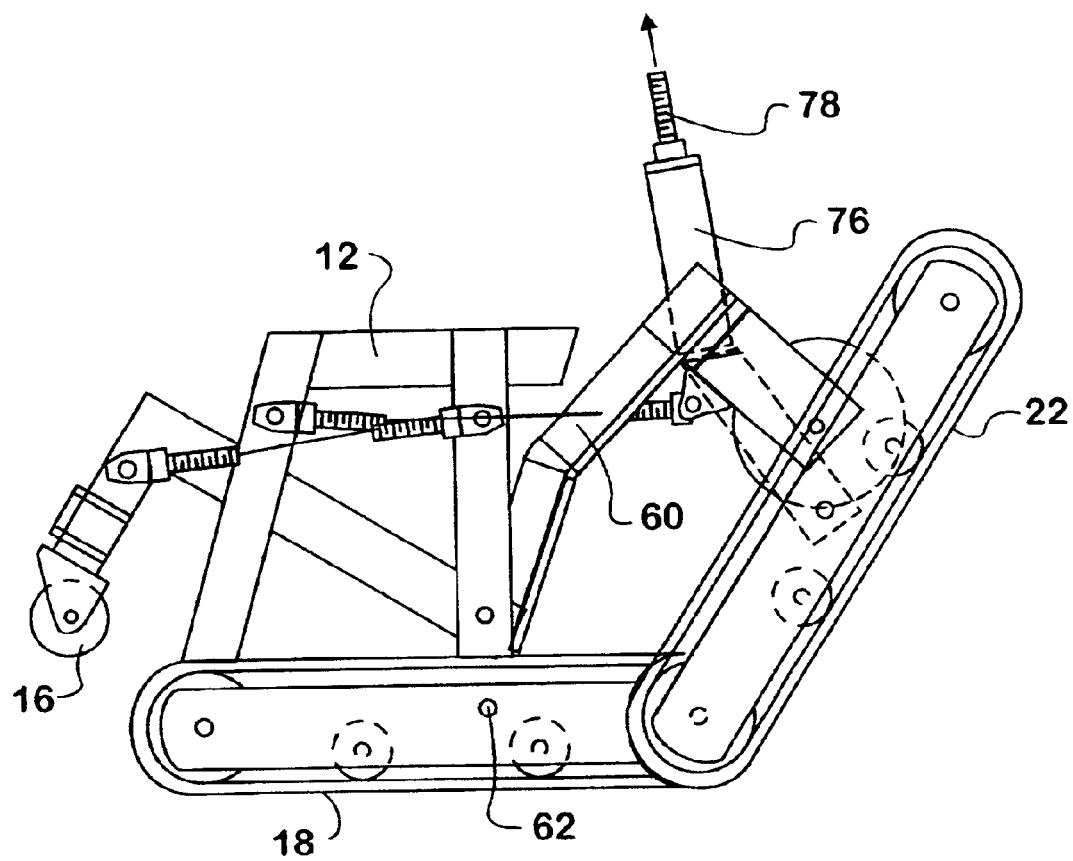
FIG. 2a is a side view of the wheelchair under carriage similar to FIG. 2 but with both the front and rear wheels elevated and with the wheelchair being driven solely by the front treads for increased traction.
Figure 4:
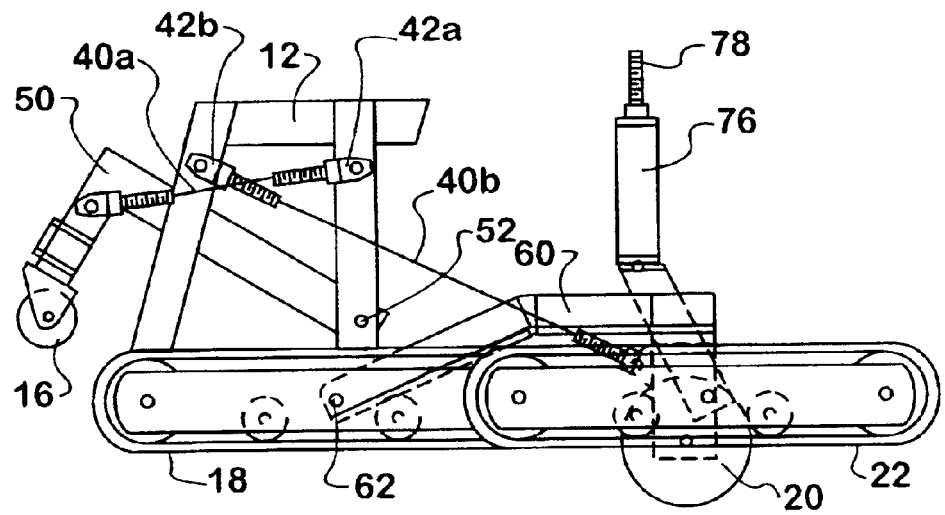
FIG. 4 is a side view of the wheelchair under carriage of FIG. 1 with the apparatus positioned showing the front support wheels lifted to assist in climbing a stair and to allow the front tread drive to contact the ground, stair or other obstacle.
Figure 5:
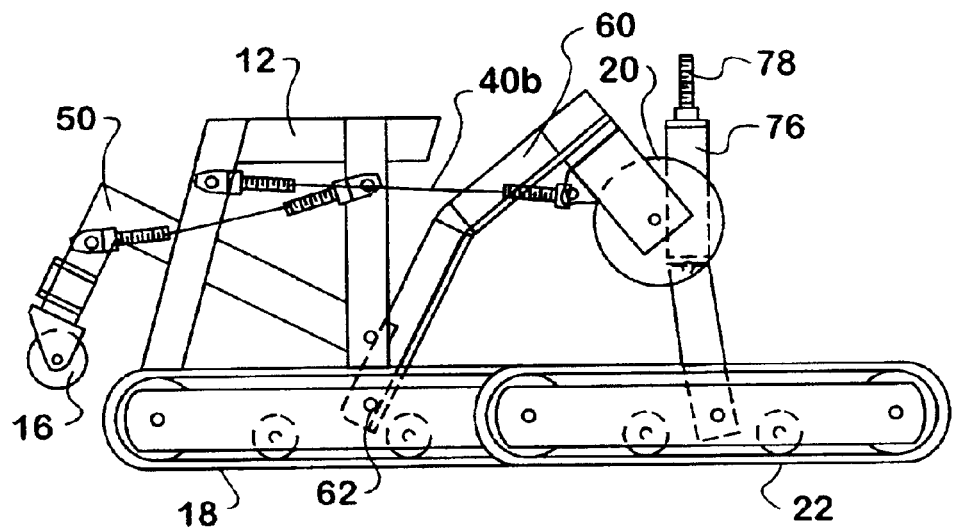
FIG. 5 is a side view of the wheelchair under carriage of FIG. 1 positioned to navigate an obstacle or stair, showing both the front support wheels and the rear drive wheels lifted to allow the entire articulated tread drive (front and rear) to contact the ground, stair or obstacle for maximum traction and control.

During operation of the wheelchair on level terrain, the rear treads 22 will normally be raised, as shown in FIG. 2, to allow the rear drive wheels 20 room to swivel, thereby facilitating sideward mobility. When increased traction is desired, both the front support wheels 16 and the rear drive wheels 20 can be raised (FIG. 2a) to allow the front tread drive 22 to contact the ground and thereby provide driving traction. Finally, the rear tread drive can be lowered such that both the front and rear treads are placed in driving contact with the ground (FIG. 5) to allow maximum traction. This is desired while traversing rough terrain or an obstacle, or as described in more detail below, the combined use of the front and rear treads allows for the safe ascent and descent of stairs.

Raising and lowering of the front and rear wheels, as described above, is achieved by retraction means for lengthening and shortening the span of the control rod connecting members 40a and 40b between the base 12 and the respective wheel supports. This retraction means is preferably in the form of electrically driven screw mechanisms 42a and 42b, the operation of which is well known in the art. These screw mechanisms are fitted to their respective control rods and serve to selectively shorten and lengthen the span of the positioning control rod extending between the base member 12 and a support for the associated wheel. Particularly, the front wheel support 50 is arranged to pivot about point 52 (see FIG. 1) and is connected by means of a front control rod 40a to the base 12. Similarly, the rear wheel support 60 is arranged to pivot about point 62 and is connected to the base 12 by a rear control rod 40b. Electrically driven screw mechanisms 42a and 42b are positioned on one or both ends of these control rods to selectively control the span of the control rod and thereby raise and lower the wheels. When fully lowered, the rear wheel support 60 contacts bar member 64, which bar is connected to the front tread drive frame 18c, thereby forcing the front tread drive into the proper position to be locked by the pin 18e.

A selectively operable pivot means is employed to raise and lower the rear tread drive and achieve the desired driving engagement of the rear tread drive. Particularly, this pivot means includes apparatus for raising and lowering of the rear tread drive by shortening and lengthening the exposed length of the connecting member disposed between the rear tread support attachment 72 and the base extension 74. In the preferred embodiment this is accomplished by an electrically operated screw mechanism. Particularly, the base extension 74 rides on the rod 78 such that rotation of the screw mechanism causes the base extension to move upwards or downwards, depending upon the direction of rotation. This rotation is accomplished in one embodiment by electrically operated gearing within (or attached to) the base extension 74, or alternatively by electrically operated means for rotating the rod 78, which means is disposed within or attached to the rod support 76. Accordingly, selective rotation of the screw mechanism thereby controls the distance between the base extension and the rear tread support attachment 72. With the rear tread arranged to pivot about the common tread drive axle shaft 80, such selective operation of the screw mechanism acts to pivot the rear tread drive about the shaft 80 and cause selective contact with the ground (contact surface). It should also be apparent that in addition to lifting and lowering the rear tread drive, this screw mechanism also controls the angular position of the chair 10 and the front tread drive relative to the rear tread to facilitate the tread "wrap-around" effect of the articulated tread drive, as described in more detail below.

In FIG. 11 a general plan view of the tread drive of the wheelchair motorizing apparatus is shown depicting the front tread drive 18 and the rear tread drive 22. The front treads are coupled to and driven by separate front electric motors 84 and the rear treads are coupled to and driven by separate rear electric motors 86, independently of the front motors. Similar to the drive for the rear drive wheels, steering is accomplished by providing a differential in the speed between the left and right treads. Preferably a common power control is provided for the two right side (front and rear) treads and a common power control is provided for the two left side (front and rear) treads, such that the left side treads are driven in concert and the right side treads are driven in concert. This common power control allows for the steering as well as accommodating any speed difference between the left and right motors. And since the front and rear drive treads are independently driven by separate motors, this tread drive can accommodate differences in the motor speeds and differences in the tread speed which can occur when climbing stairs or traversing obstacles.

Figure 6A:
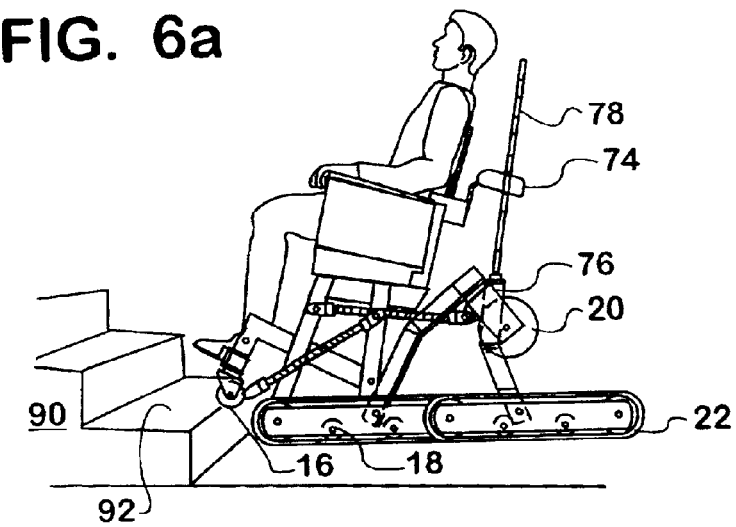
Figure 6B:
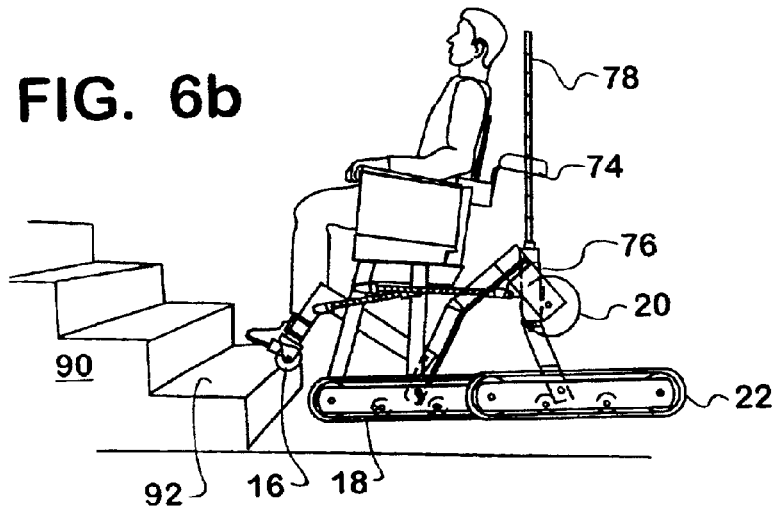
Figure 6C:
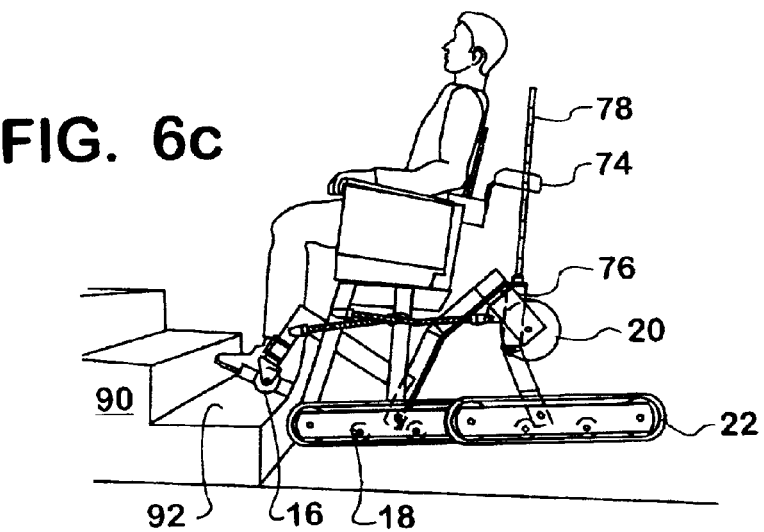
Figure 6G:
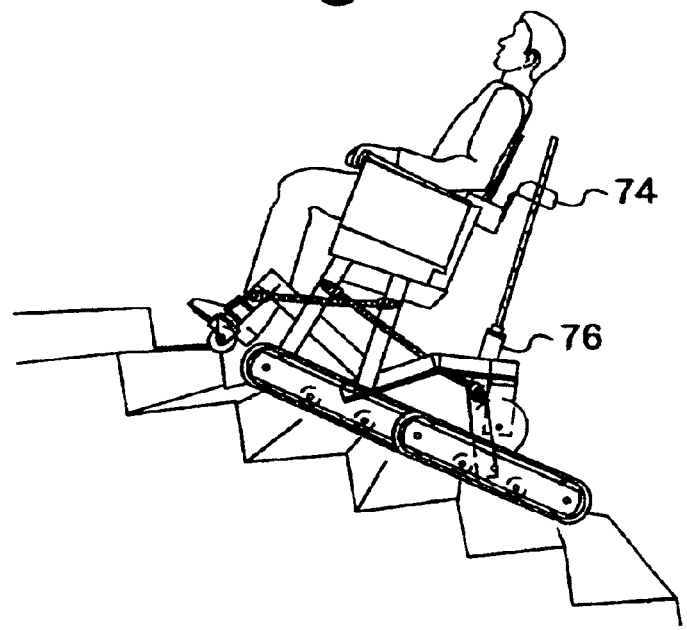
Figure 6H:
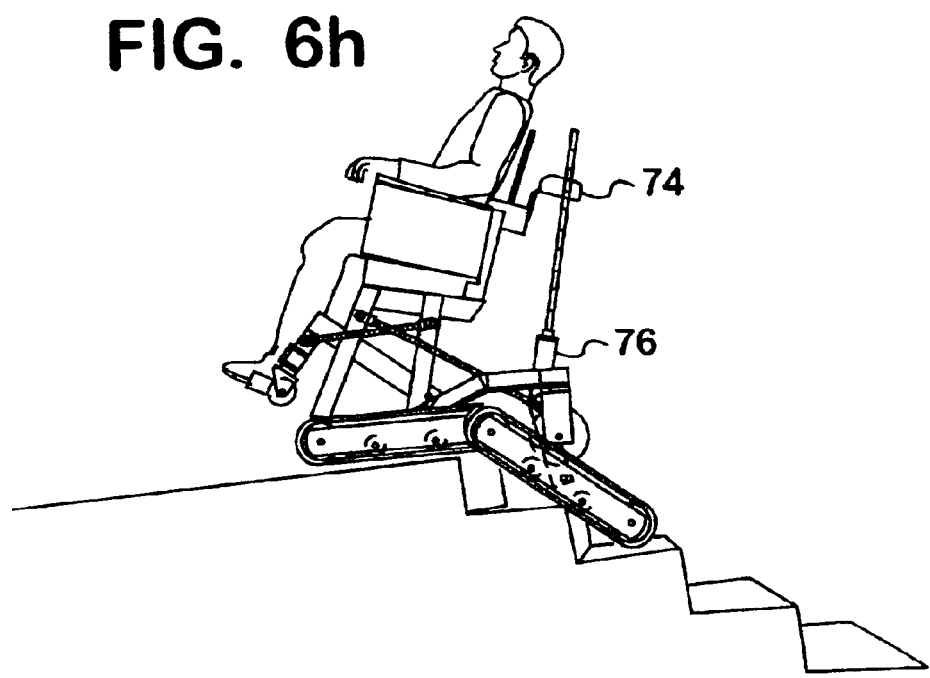

Stair climbing with the wheelchair of the present invention may easily be accomplished in the manner shown in FIGS. 6a–6h. As depicted in FIG. 6a the wheelchair is shown approaching the stairway 90 with the under carriage in an obstacle encounter arrangement, the front support wheels 16 and the rear drive wheels 20 are raised and the rear tread drive 22 is lowered to drive the wheelchair. As the wheelchair reaches the stairs, the front wheels are positioned on the first step 92 (FIG. 6b) while the front tread drive 18 and the rear tread drive 22 move the wheelchair forward. The front wheels then are used (FIG. 6c) to lift the front of the wheelchair while the wheelchair is driven forward onto the first step 92 (FIG. 6d). The front wheels will then be repositioned on the second step (FIGS. 6e–6f) to again lift the front of the wheelchair, if necessary, to achieve the desired tread drive contact position. From this position the wheelchair can continue up the stairway (FIG. 6g) safely under non-slip tread drive, with both the front and rear tread drives in contact with the stairs. As the wheelchair reaches the top of the stairway (FIG. 6h), further operation of the aforementioned pivot means for the rear tread drive acts to keep both the front tread drive 18 and the rear tread drive 22 in contact with the steps. This occurs due to the fact that by extending the length of the rod disposed between the base extension and the rear tread drive support forces the rear treads downward and, at the same time, forces the front treads over the top step in a "wrap-around" effect.

Figure 7A:
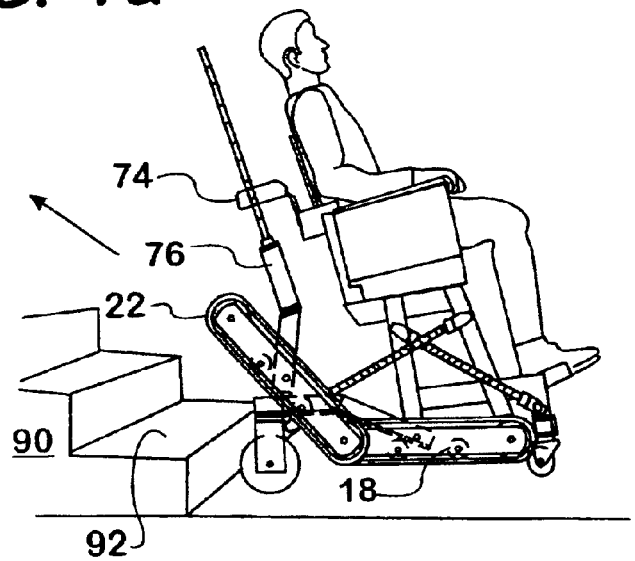
FIGS. 7a and 7b are sequential views showing the wheelchair ascending a stairway "backward" and further illustrating the employment of the tread drive feature for climbing stairs.
Figure 7B:
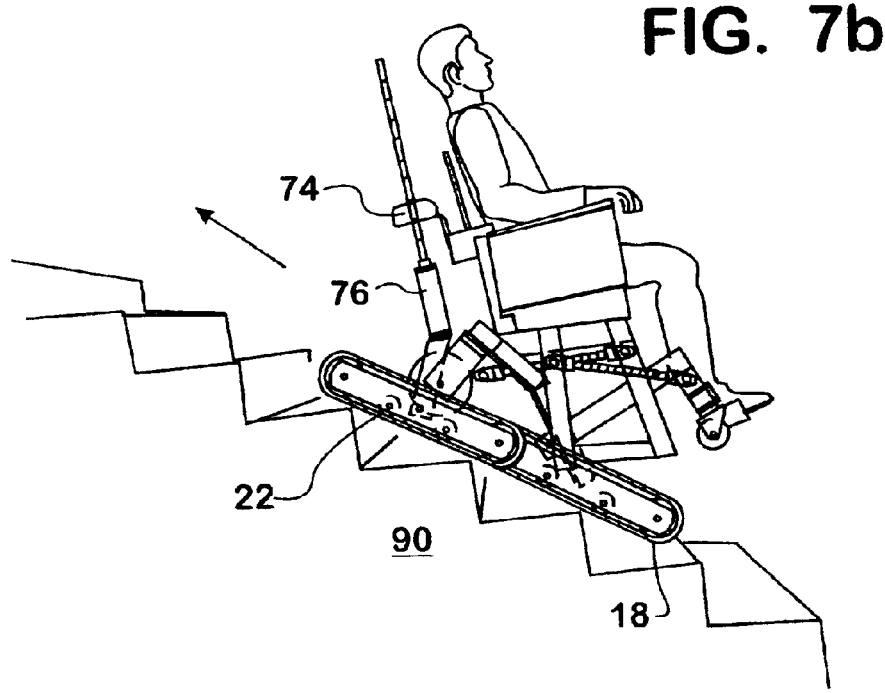

The motorizing apparatus of the present invention also allows for the operator to ascend the stairs "backward" if desired. As shown in FIGS. 7a–7b, the operator can back-up to the stairs with the under carriage in the normal driving position (FIG. 7a). The operator would then raise the front and rear wheels and lower the rear tread to the arrangement shown in FIG. 5. Then, under tread driving power the wheelchair can safely ascend the stairway (FIG. 7b). Upon reaching the top of the stairs, the wheels can be lowered again and the rear tread drive raised to the normal operating arrangement.

Figure 8A:
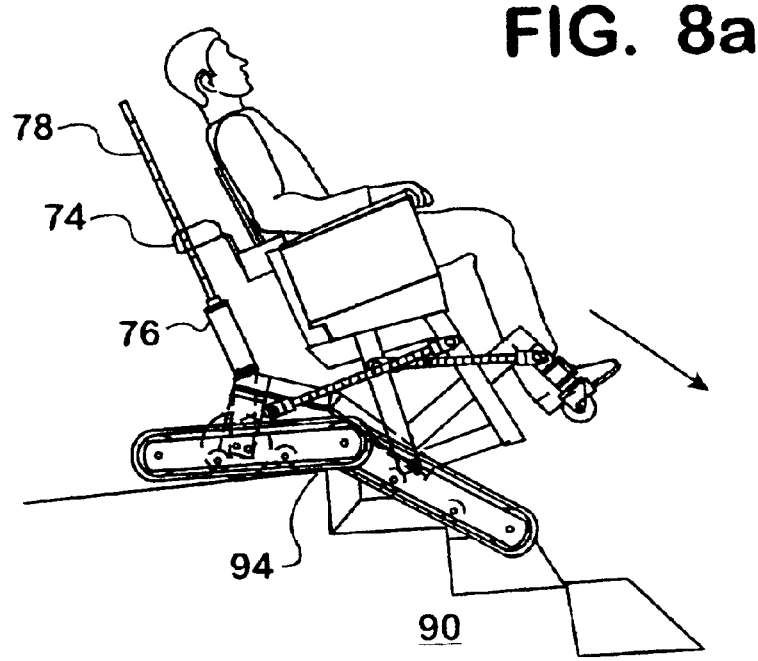
FIGS. 8a and 8b are sequential views showing the wheelchair descending a stairway and further illustrating the tread drive feature.
Figure 8B:
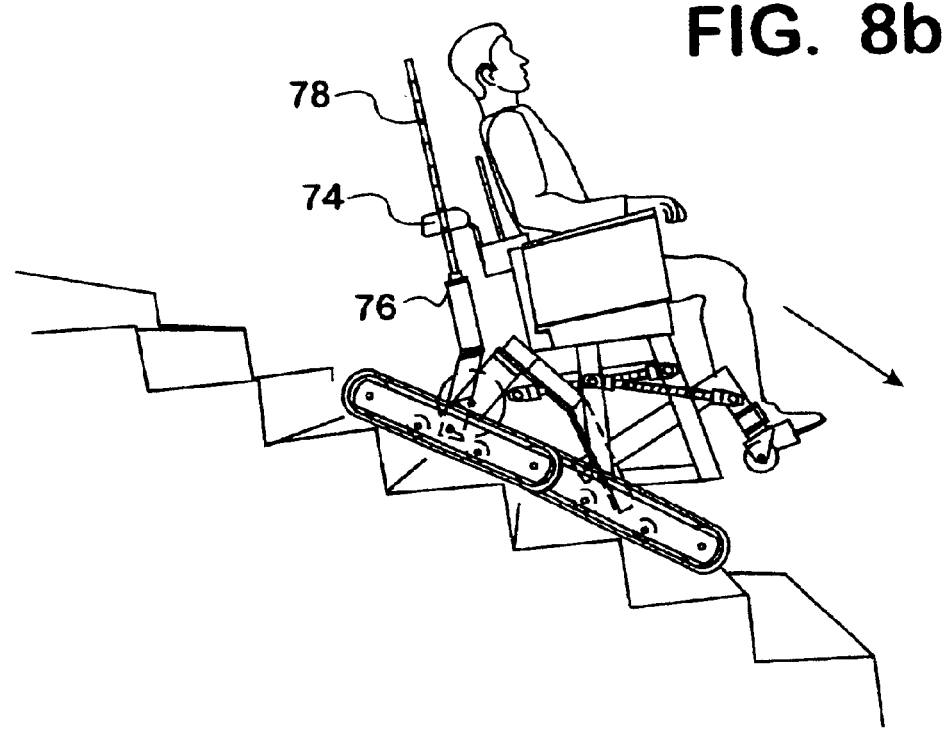

The method for descent of a stairway is depicted in FIGS. 8a–8b. Generally, the occupant will approach the stairway and stop at the top, whereupon the front and rear wheels are retracted (as in FIG. 5) and the tread drive is employed. The rear tread drive pivot means is then operated to articulate the tread drive; forcing the front and rear treads down and causing them to pivot relative to one another about their common shaft 80. This causes the tread drives to maintain safe contact with the steps, in a wrap-around effect, as the wheelchair proceeds over the top step 94 (FIG. 8a). Once on the stairway, the wheelchair can then proceed downward (FIG. 8b) with the tread drive in engagement with the stairway.

It should be appreciated that this wheelchair will generally traverse rough terrain of all sorts, including small obstacles, under tread drive locomotion without the manipulation used to climb stairs, described in detail above. However, when large obstacles are encountered, the same procedures used to climb stairs are employable to the extent required to safely traverse the obstacle.

Figure 9A:
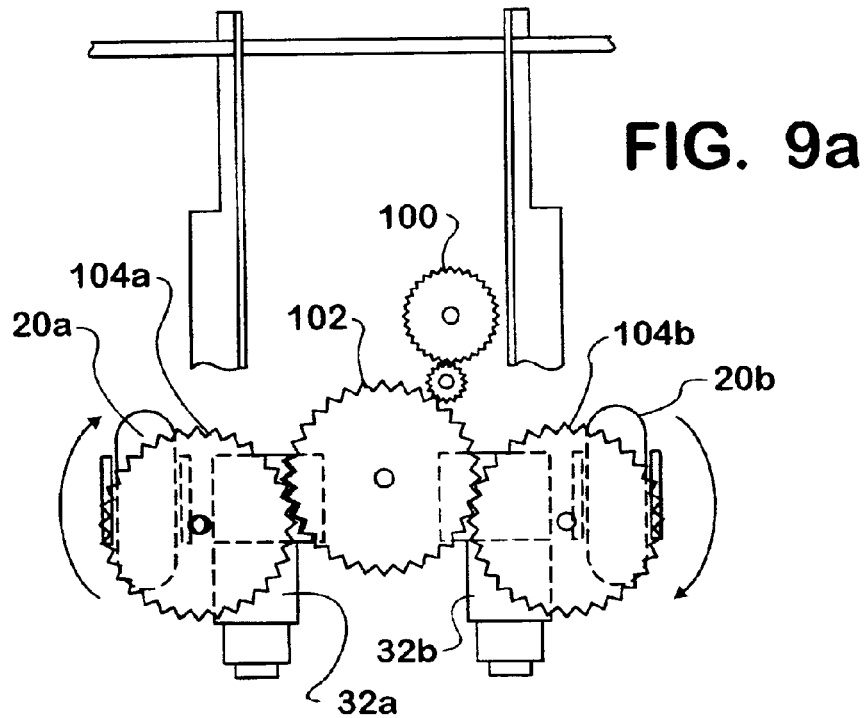
FIGS. 9a and 9b are plan views of a gear controlled swivel mechanism for the rear wheels showing the swivel steering feature that allows for the wheelchair to turn around in tight quarters.
Figure 9B:
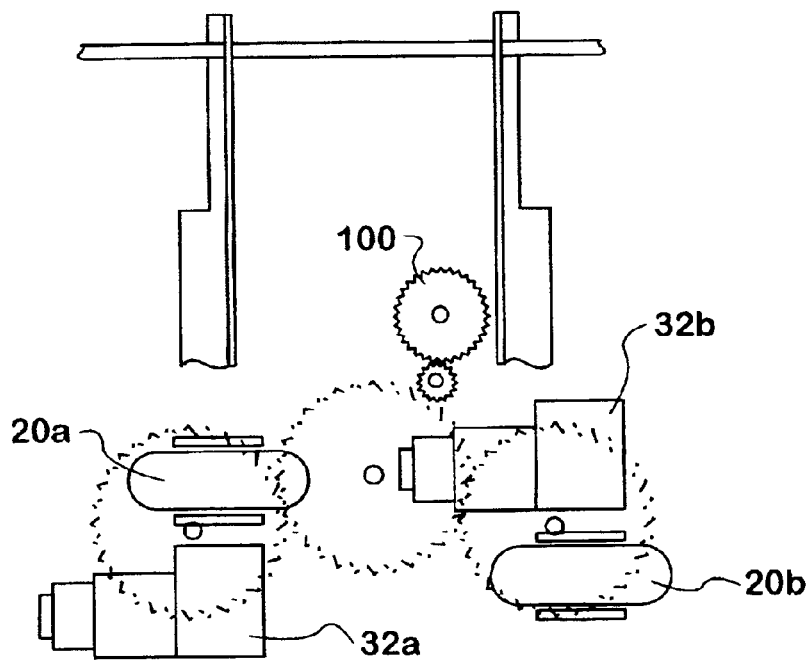

Turning now to the swivel steering feature of the invention, there is shown in FIGS. 9a and 9b a plan view of the rear wheel drive apparatus. Rear wheels 20a and 20b are driven by electric motors 32a and 32b in either the forward or reverse direction. These drive motors are under independent control and consequently can steer the wheelchair by providing a selected differential in the speeds of the wheels. However, for sharper turns there is provided a swivel steering feature in which the rear wheels swivel to direct the drive motion in a sideward fashion. Particularly, a swivel drive motor 100 with an attached gear is positioned to cause rotation of a swivel gear assembly 102. Planetary gears 104a and 104b are affixed to respective rear drive wheel assemblies such that rotation of the planetary gears causes like rotation of the wheel assemblies. While these gears can be rotated through 360 degrees, they are depicted in FIG. 9b as having been rotated 90 degrees and are shown in FIG. 9b in phantom for clarity.

Figure 10A:
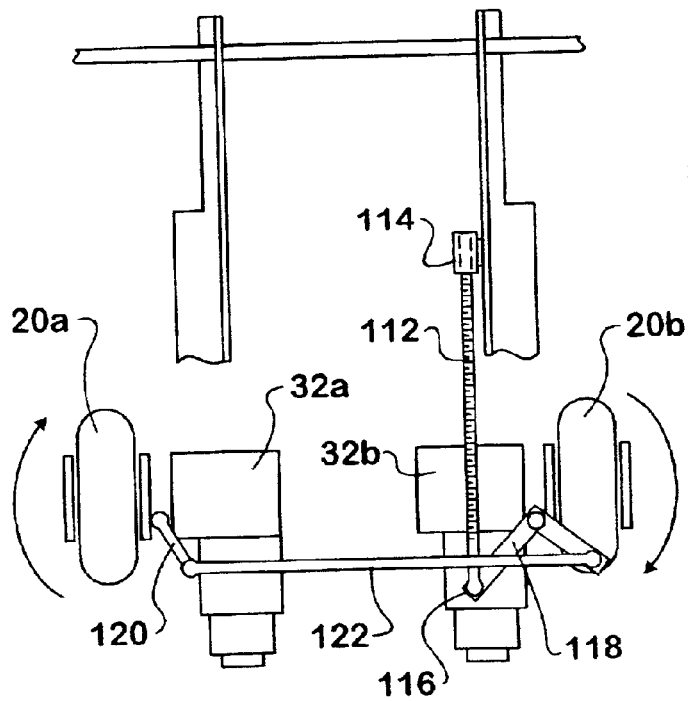
FIGS. 10a and 10b are plan views of an alternative linkage controlled rear wheel swivel mechanism.
Figure 10B:
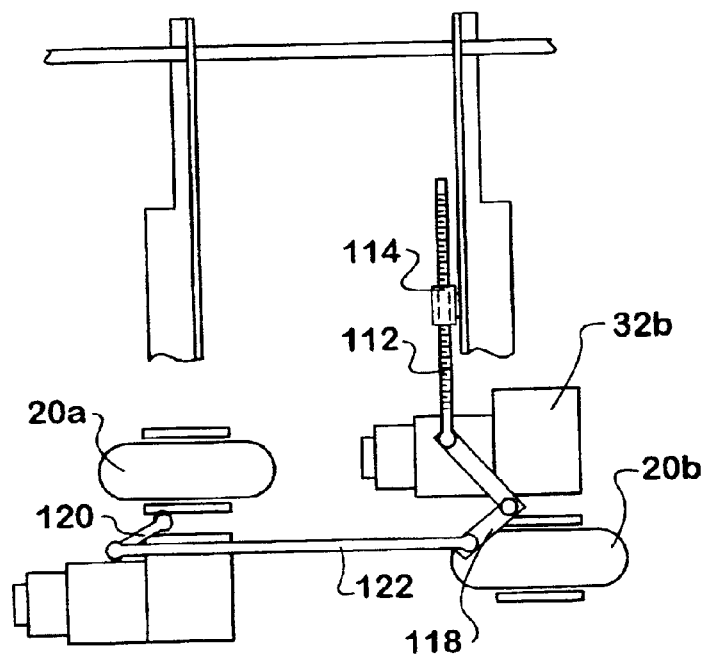

Alternatively, there is shown in FIGS. 10a and 10b a linkage controlled swivel steering mechanism. A main link 112 is operated by an electrically driven screw device 114 to lengthen and shorten its operable length and thereby selectively move its extremity 116. Connected to this extremity 116 for pivotal motion is an angle member 118. This angle member is connected to the right rear wheel motor assembly 32b, such that motion of the angle member 118 causes like motion of the wheel assembly. Attached to the other wheel assembly 32a is a bar member 120, such that motion of the bar member causes like motion of the left wheel assembly. Finally, connecting the bar member 120 and the angle member 118 through pivoting connections is a connecting rod 122. It should now be apparent that selective motion caused by the electric screw 114 to shorten or lengthen the operable length of the main link 112 causes rotation of the wheel assemblies. Particularly, from a forward drive position, shown in FIG. 10a, shortening of the operable length of the main link 112 causes rotation of the angle member 118 and the bar member 120. This, in turn, causes the wheels to turn to the sideward position shown in FIG. 10b.

From the foregoing description, it will be apparent that modifications can be made to the apparatus and method for using same without departing from the teachings of the present invention. Accordingly, the scope of the invention is only to be limited as necessitated by the accompanying claims.

What is claimed is:

1. A wheelchair motorizing apparatus for providing locomotion along a contact surface comprising:
   a wheelchair base member;
   an articulated tread drive affixed to said wheelchair base member for causing selective locomotion of said wheelchair along the contact surface;
   rear drive wheels for selective engagement with the contact surface;
   means for swiveling said rear drive wheels for steering; and
   means for providing driving torque to said rear drive wheels.

2. The wheelchair apparatus of claim 1 wherein said means for providing driving torque to said rear drive wheels comprises independently controlled motors connected to each of said respective drive wheels and mounted in combination therewith, wherein said motors turn with said respective drive wheels.

3. The wheelchair apparatus of claim 2 wherein said means for swiveling said rear drive wheels further comprises planetary gears attached to each of said drive wheel and motor combinations, wherein said planetary gears are driven by a swivel drive motor.

4. The wheelchair apparatus of claim 2 wherein said means for swiveling said rear drive wheels further comprises linkage attached to said respective drive wheel and motor combinations, wherein said rear drive wheels are caused to swivel by motion of said linkage.

5. The wheelchair apparatus of claim 1 further comprising retraction means for selectively raising and lowering said rear drive wheels of said wheelchair apparatus.

6. The wheelchair apparatus of claim 5 wherein said means for providing driving torque to said rear drive wheels comprises independently controlled motors connected to each of said respective drive wheels and mounted in combination therewith, wherein said motors turn with said respective drive wheels.

7. The wheelchair apparatus of claim 6 wherein said means for swiveling said rear drive wheels further comprises planetary gears attached to each of said drive wheel and motor combinations, wherein said planetary gears are driven by a swivel drive motor.

8. The wheelchair apparatus of claim 6 wherein said means for swiveling said rear drive wheels further comprises linkage attached to said respective drive wheel and motor combinations, wherein said rear drive wheels are caused to swivel by motion of said linkage.

9. A wheelchair motorizing apparatus for providing locomotion along a contact surface comprising:

a wheelchair base member;

an articulated tread drive affixed to said wheelchair base member for causing selective locomotion of said wheelchair apparatus along the contact surface, wherein said articulated tread drive comprises front and rear tread drives;

pivot means connected between said base member and said rear tread drive for raising and lowering said rear tread drive and for controlling the angular position of said base member;

rear drive wheels for selective engagement with the contact surface;

means for swiveling said rear drive wheels for steering; and means for providing driving torque to said rear drive wheels.

10. The wheelchair apparatus of claim 9 wherein said means for providing driving torque to said rear drive wheels comprises independently controlled motors connected to each of said respective drive wheels and mounted in combination therewith, wherein said motors turn with said respective drive wheels.

11. The wheelchair apparatus of claim 10 wherein said means for swiveling said rear drive wheels further comprises planetary gears attached to each of said drive wheel and motor combinations, wherein said planetary gears are driven by a swivel drive motor.

12. The wheelchair apparatus of claim 10 wherein said means for swiveling said rear drive wheels further comprises linkage attached to said respective drive wheel and motor combinations, wherein said rear drive wheels are caused to swivel by motion of said linkage.

13. A wheelchair motorizing apparatus for providing locomotion along a contact surface comprising:

a wheelchair base member;

an articulated tread drive affixed to said wheelchair base member for causing selective locomotion of said wheelchair apparatus along the contact surface, wherein said articulated tread drive comprises front and rear tread drives; and pivot means connected between said base member and said rear tread drive for raising and lowering said rear tread drive and for controlling the angular position of said base member;

wherein said pivot means comprises a screw mechanism connected between said rear tread drive and said wheelchair base member, whereby rotation of said screw mechanism causes said wheelchair base member to move relative to said rear tread drive.

14. The wheelchair apparatus of claim 13 further comprising rear drive wheels for selective engagement with the contact surface, means for swiveling said rear drive wheels for steering, and means for providing driving torque to said rear drive wheels.

15. The wheelchair apparatus of claim 14 wherein said means for providing driving torque to said rear drive wheels comprises independently controlled motors connected to each of said respective drive wheels and mounted in combination therewith, wherein said motors turn with said respective drive wheels.

16. The wheelchair apparatus of claim 15 wherein said means for swiveling said rear drive wheels further comprises planetary gears attached to each of said drive wheel and motor combinations, wherein said planetary gears are driven by a swivel drive motor.

17. The wheelchair apparatus of claim 15 wherein said means for swiveling said rear drive wheels further comprises linkage attached to said respective drive wheel and motor combinations, wherein said rear drive wheels members are caused to swivel by motion of said linkage.

18. A wheelchair motorizing apparatus for providing locomotion along a contact surface comprising:

a wheelchair base member;

an articulated tread drive affixed to said wheelchair base member for causing selective locomotion of said wheelchair along the contact surface, having front and rear tread drives defined thereon;

wherein said rear tread drive comprises rear left and rear right independently driven tread drive mechanisms, and wherein said front tread drive comprises front left and front right independently driven tread drive mechanisms.

19. The wheelchair apparatus of claim 18 wherein said left front tread drive and said left rear tread drive are driven in concert, and wherein said right front tread drive and said right rear tread drives are driven in concert.

* * * * *